US009335409B2

(12) United States Patent
Abatzoglou et al.

(10) Patent No.: US 9,335,409 B2
(45) Date of Patent: May 10, 2016

(54) BISTATIC INVERSE SYNTHETIC APERTURE RADAR IMAGING

(71) Applicant: RAYTHEON COMPANY, Waltham, MA (US)

(72) Inventors: Theagenis J. Abatzoglou, Huntington Beach, CA (US); Johan E. Gonzalez, Carson, CA (US)

(73) Assignee: Raytheon Company, Waltham, MA (US)

( * ) Notice: Subject to any disclaimer, the term of this patent is extended or adjusted under 35 U.S.C. 154(b) by 463 days.

(21) Appl. No.: 13/847,764

(22) Filed: Mar. 20, 2013

(65) Prior Publication Data

US 2014/0285371 A1    Sep. 25, 2014

(51) Int. Cl.
*G01S 13/89*    (2006.01)
*G01S 13/90*    (2006.01)
*G01S 7/295*    (2006.01)
*G01S 13/58*    (2006.01)

(52) U.S. Cl.
CPC ............... *G01S 13/90* (2013.01); *G01S 7/2955* (2013.01); *G01S 13/582* (2013.01); *G01S 13/589* (2013.01); *G01S 2013/9058* (2013.01); *G01S 2013/9064* (2013.01)

(58) Field of Classification Search
CPC ............ G01S 13/9029; G01S 13/9035; G01S 13/003; G01S 2013/9058; G01S 13/589; G01S 2013/9064
USPC .......................... 342/25 R–25 F, 59, 107, 191
See application file for complete search history.

(56) References Cited

U.S. PATENT DOCUMENTS 5,113,193 A  *  5/1992   Powell .................. G01S 13/003
                                                                            342/109

(Continued)

OTHER PUBLICATIONS

Blackman, "Multiple-Target Tracking with Radar Applications", Artech House, Inc., 1986, Chapter 13, pp. 357-367.
Griffiths, "Bistatic and Multistatic Radar", University College London, Dept. Electronic and Electrical Engineering, Torrington Place, London WC1E 7JE, UK, 2003, 9 pages.

(Continued)

*Primary Examiner* — John B Sotomayor
*Assistant Examiner* — Marcus Windrich
(74) *Attorney, Agent, or Firm* — Burns & Levinson LLP; Joseph M. Maraia

(57) ABSTRACT

A bistatic synthetic aperture radar (SAR) imaging system and method include: combining each radar return pulse from airborne radar platforms with a sinusoid; deskewing each reduced radar return pulse; estimating motion parameters based on a maximum likelihood estimation (MLE); performing MLE motion correction to generate motion-corrected radar return pulses; acquiring position and velocity estimates of the airborne radar platforms and scattering locations; defining bistatic range and velocity vectors; defining new bistatic range and velocity vectors in a new set of orthogonal axes; projecting vector distance differences between the radar scattering locations along the new set of orthogonal axes to generate new range and velocity measurements along the new set of orthogonal axes; converting the new range and velocity measurements to map Doppler frequency into cross-range; and forming a bistatic SAR image in range and cross-range based on cross-range extent derived from the Doppler frequency mapping.

10 Claims, 4 Drawing Sheets

(56) References Cited

U.S. PATENT DOCUMENTS

| | | | | |
|---|---|---|---|---|
| 6,608,584 | B1* | 8/2003 | Faulkner | G01S 13/003 342/102 |
| 7,289,060 | B1* | 10/2007 | Abatzoglou | G01S 7/412 342/175 |
| 7,969,345 | B2* | 6/2011 | Abatzoglou | G01S 13/282 342/25 R |
| 8,816,896 | B2* | 8/2014 | Abatzoglou | G01S 13/90 342/105 |
| 2005/0280571 | A1* | 12/2005 | Abatzoglou | G01S 13/9029 342/25 B |
| 2009/0066562 | A1* | 3/2009 | Altes | G01S 13/9029 342/25 F |
| 2010/0259442 | A1* | 10/2010 | Abatzoglou | G01S 13/282 342/25 A |

OTHER PUBLICATIONS

Pastina et al., "Multi-platform ISAR for flying formation", IEEE, 2009, 6 pages.

Mishra et al., "Bistatic SAR ATR", IET Radar Sonar Navig., 2007, 1, (6), pp. 459-469.

Walterscheid et al., "Bistatic SAR Processing and Experiments", IEEE Transactions on Geoscience and Remote Sensing, vol. 44, No. 10, Oct. 2006, pp. 2710-2717.

Willis, "Bistatic Radar", SciTech Publishing, Inc., Raleigh, NC, 2005, 18 pages.

McCandless, et al., "Chapter 1. Principles of Synthetic Aperture Radar", SAR Marine User's Manual, 2004, pp. 1-23.

* cited by examiner

BISTATIC INVERSE SYNTHETIC APERTURE RADAR IMAGING

BACKGROUND

Airborne maritime surveillance platforms employ low band radars that operate at UHF frequencies. Other low band surveillance radars have been designed to use S-Band or L-band. Typical platforms use radar with an approximately 50 MHz operational bandwidth. If a 50 MHZ radar platform is used, the instantaneous pulse bandwidth is insufficient to achieve 1 m resolution in down-range. Generally, a resolution of at least 1 m is required to carry out robust image exploitation of incoming targets. The required resolution can be obtained in cross-range with a bistatic radar imaging system that uses a precise oscillator to maintain coherence between the transmitting and receiving platforms.

There are other advantages to bistatic inverse synthetic aperture radar (ISAR) imaging. Tracking of the target from two (or more) platforms can be combined to arrive at a more accurate kinematic profile (e.g., position, speed, heading) of the target. There is reason to believe that bistatic sea clutter may be less "spiky" than the equivalent monostatic sea clutter, and hence that bistatic geometries are more favorable for the detection of small targets. Also, multipath mitigation may be more easily realizable with a bistatic imaging system due to higher decorrelation of the multipath return in the radar compared to the monostatic scenario. In addition, the spatial diversity afforded by bistatic/multistatic systems allows for different aspects of a target to be viewed simultaneously. Also, it may be increasingly difficult to successfully focus jamming on multiple receivers in a bistatic/multistatic system compared to a single receiver.

However, unlike the typical scenario in SAR imaging, airborne ISAR imaging is more complicated because both the platform and the target are moving during the course of the data collection dwell. Conventional ISAR imaging techniques often produce images with unwanted distortion.

SUMMARY

The technology described herein relates to forming bistatic ISAR images of airborne targets by mapping Doppler frequency to cross-range, in physical length units. Tracking of the target motion during data collection enables the ISAR system to accurately motion compensate in the airborne ISAR images. The implementations described herein for mapping Doppler frequency to cross-range is robust under a variety of tracking errors and deviations from a broadside collection geometry.

One embodiment is a bistatic synthetic aperture radar (SAR) imaging method. The method includes receiving a plurality of radar return pulses acquired by at least first and second airborne radar platforms, wherein each radar return pulse is generated in response to a corresponding transmission pulse reflected from two or more radar scattering locations on a target. The method also includes combining each radar return pulse with a sinusoid to reduce the radar return pulses to a base band frequency. The method also includes deskewing each reduced radar return pulse to remove effects of its corresponding radar transmission pulse. The method also includes estimating motion parameters of the target based on maximum likelihood estimation (MLE) applied to the deskewed radar return pulses. The method also includes performing MLE motion correction to the deskewed radar return pulses based on the estimated motion parameters to generate motion corrected radar return pulses. The method also includes acquiring position and velocity estimates of the two or more airborne radar platforms and the one or more scattering locations on the target. The method also includes defining bistatic range and velocity vectors based on the position and velocity estimates of the first and second airborne radar platforms, the one or more scattering locations on the target, and the motion corrected radar return pulses. The method also includes defining new bistatic range and velocity vectors by redefining the bistatic range and velocity vectors in a new set of orthogonal axes. The method also includes projecting vector distance differences between the target radar scattering locations along the new set of orthogonal axes to generate new range and velocity measurements along the new set of orthogonal axes. The method also includes converting the new range and velocity measurements in order to map Doppler frequency into cross-range, measured in physical units of length. The method also includes forming a bistatic SAR image in range and cross-range based on cross-range extent derived from the Doppler frequency mapping.

In some embodiments, the bistatic range and velocity vectors are defined according to:

$$\vec{p}_{bistatic} = \frac{(\vec{p}_2(0) - \vec{p}_s(0))}{\|\vec{p}_2(0) - \vec{p}_s(0)\|} + \frac{(\vec{p}_1(0) - \vec{p}_s(0))}{\|\vec{p}_1(0) - \vec{p}_s(0)\|},$$

and $$\vec{p}_{bistatic\_vel} = \begin{bmatrix} \frac{(\vec{p}'_2(0) - \vec{p}'_s(0))}{\|\vec{p}_2(0) - \vec{p}_s(0)\|} + \frac{(\vec{p}_2(0) - \vec{p}_s(0))}{\|\vec{p}_2(0) - \vec{p}_s(0)\|^2} \cdot (\vec{p}'_2(0) - \vec{p}'_s(0)) \frac{(\vec{p}_2(0) - \vec{p}_s(0))}{\|\vec{p}_2(0) - \vec{p}_s(0)\|} + \\ \frac{(\vec{p}'_1(0) - \vec{p}'_s(0))}{\|\vec{p}_1(0) - \vec{p}_s(0)\|} + \frac{(\vec{p}_1(0) - \vec{p}_s(0))}{\|\vec{p}_1(0) - \vec{p}_s(0)\|^2} \cdot (\vec{p}'_1(0) - \vec{p}'_s(0)) \frac{(\vec{p}_1(0) - \vec{p}_s(0))}{\|\vec{p}_1(0) - \vec{p}_s(0)\|} \end{bmatrix}$$

where $\vec{p}_{bistatic}$ is the bistatic range vector and $\vec{p}_{bistatic\_vel}$ is the bistatic velocity vector, and $\vec{p}_1(0)$ is a vector of an initial position of the first airborne radar platform, $\vec{p}_2(0)$ is a vector of an initial position of the second airborne radar platform, $\vec{p}_1'(0)$ is a vector of an initial velocity of the first airborne radar platform, $\vec{p}_2'(0)$ is a vector of an initial velocity of the second airborne radar platform and $\vec{p}_s(0)$ is a vector of an initial position of a scatterer on the target, and $\vec{p}_s'(0)$ is a vector of an initial velocity of the scatterer on the target.

In some embodiments, the new bistatic range and velocity vectors are orthogonal parameters determined in accordance with:

$\vec{p}_{bistatic}$, and $$\vec{p}_{bistatic\_vel\_new} = \vec{p}_{bistatic\_vel} - \frac{(\vec{p}_{bistatic} \cdot \vec{p}_{bistatic\_vel})}{\|\vec{p}_{bistatic}\|^2} \vec{p}_{bistatic}.$$

In some embodiments, the new range and velocity measurements along the new set of orthogonal axes are determined in accordance with:

$$\Delta r_{bistatic} = -\Delta \vec{p}_s \cdot \vec{p}_{bistatic}$$

$$\Delta v_{bistatic\_new} = \Delta \vec{p}_s \cdot \vec{p}_{bistatic\_vel\_new},$$

where $\Delta \vec{p}_s$ is difference between a dominat scattering location on the target and a second scattering location on the target.

In some embodiments, the method includes using the new range and velocity measurements to define cross-range resolution $\Delta R_{cross\_range}$ and cross-range extent $\Delta R_{extent}$ in accordance with:

$$\Delta R_{cross\_range} = \frac{1}{\|\vec{p}_{bistatic\_vel\_new}\|} \frac{\lambda}{T_{dwell}},$$

and $$\Delta R_{extent} = \frac{1}{\|\vec{p}_{bistatic\_vel\_new}\|} \frac{\lambda}{IPP},$$

where $\lambda$ is the wavelength at the center frequency of the radar pulses, $T_{dwell}$ is dwell duration of the radar pulses, and IPP is the reciprocal of pulse repetition frequency (PRF) of the radar pulses.

Another implementation is a bistatic synthetic aperture radar (SAR) imaging system. The system includes one or more processor and a memory. The memory includes executable code representing instructions that when executed cause the system to receive a plurality of radar return pulses acquired by at least first and second airborne radar platforms, wherein each radar return pulse is generated in response to a corresponding transmission pulse reflected from two or more radar scattering locations on a target. The memory includes executable code representing instructions that when executed cause the system to combine each radar return pulse with a sinusoid to reduce the radar return pulses to a base band frequency. The memory includes executable code representing instructions that when executed cause the system to deskew each reduced radar return pulse to remove effects of its corresponding radar transmission pulse. The memory includes executable code representing instructions that when executed cause the system to estimate motion parameters of the target based on a maximum likelihood estimation (MLE) applied to the deskewed radar return pulses. The memory includes executable code representing instructions that when executed cause the system to perform MLE motion correction to the deskewed radar return pulses based on the estimated motion parameters to generate motion corrected radar return pulses. The memory includes executable code representing instructions that when executed cause the system to acquire position and velocity estimates of the two or more airborne radar platforms and the one or more scattering locations on the target. The memory includes executable code representing instructions that when executed cause the system to define bistatic range and velocity vectors based on the position and velocity estimates of the first and second airborne radar platforms, the one or more scattering locations on the target, and the motion corrected radar return pulses. The memory includes executable code representing instructions that when executed cause the system to define new bistatic range and velocity vectors by redefining the bistatic range and velocity vectors in a new set of orthogonal axes. The memory includes executable code representing instructions that when executed cause the system to project vector distance differences between the target radar scattering locations along the new set of orthogonal axes to generate new range and velocity measurements along the new set of orthogonal axes. The memory includes executable code representing instructions that when executed cause the system to convert the new range and velocity measurements in order to map Doppler frequency into cross-range, measured in physical units of length. The memory includes executable code representing instructions that when executed cause the system to form a bistatic SAR image in range and cross-range based on cross-range extent derived from the Doppler frequency mapping.

In some embodiments, the bistatic range and velocity vectors are defined according to:

$$\vec{p}_{bistatic} = \frac{(\vec{p}_2(0) - \vec{p}_s(0))}{\|\vec{p}_2(0) - \vec{p}_s(0)\|} + \frac{(\vec{p}_1(0) - \vec{p}_s(0))}{\|\vec{p}_1(0) - \vec{p}_s(0)\|}$$

$$\vec{p}_{bistatic\_vel} = \begin{bmatrix} \frac{(\vec{p}_2'(0) - \vec{p}_s'(0))}{\|\vec{p}_2(0) - \vec{p}_s(0)\|} + \frac{(\vec{p}_2(0) - \vec{p}_s(0))}{\|\vec{p}_2(0) - \vec{p}_s(0)\|^2} \cdot (\vec{p}_2'(0) - \vec{p}_s'(0)) \frac{(\vec{p}_2(0) - \vec{p}_s(0))}{\|\vec{p}_2(0) - \vec{p}_s(0)\|} + \\ \frac{(\vec{p}_1'(0) - \vec{p}_s'(0))}{\|\vec{p}_1(0) - \vec{p}_s(0)\|} + \frac{(\vec{p}_1(0) - \vec{p}_s(0))}{\|\vec{p}_1(0) - \vec{p}_s(0)\|^2} \cdot (\vec{p}_1'(0) - \vec{p}_s'(0)) \frac{(\vec{p}_1(0) - \vec{p}_s(0))}{\|\vec{p}_1(0) - \vec{p}_s(0)\|} \end{bmatrix}$$

where $\vec{p}_{bistatic}$ is the bistatic range vector and $\vec{p}_{bistatic\_vel}$ is the bistatic velocity vector, and $\vec{p}_1(0)$ is a vector of an initial position of the first airborne radar platform, $\vec{p}_2(0)$ is a vector of an initial position of the second airborne radar platform, $\vec{p}_1'(0)$ is a vector of an initial velocity of the first airborne radar platform, $\vec{p}_2'(0)$ is a vector of an initial velocity of the second airborne radar platform and $\vec{p}_s(0)$ is a vector of an initial position of a scatterer on the target, and $\vec{p}'_s(0)$ is a vector of an initial velocity of the scatterer on the target.

In some embodiments, the new bistatic range and velocity vectors are orthogonal parameters determined in accordance with:

$$\vec{p}_{bistatic},$$

and $$\vec{p}_{bistatic\_vel\_new} = \vec{p}_{bistatic\_vel} - \frac{(\vec{p}_{bistatic} \cdot \vec{p}_{bistatic\_vel})}{\|\vec{p}_{bistatic}\|^2}\vec{p}_{bistatic}.$$

In some embodiments, the new range and velocity measurements along the new set of orthogonal axes are determined in accordance with:

$$\Delta r_{bistatic} = -\Delta \vec{p}_s \cdot \vec{p}_{bistatic}$$

$$\Delta v_{bistatic\_new} = \Delta \vec{p}_s \cdot \vec{p}_{bistatic\_vel\_new},$$

where $\Delta \vec{p}_s$ is difference between a dominant scattering location on the target and a second scattering location on the target.

In some embodiments, the memory includes executable code representing instructions that when executed cause the system to use the new range and velocity measurements to define cross-range resolution $\Delta R_{cross\_range}$ and cross-range extent $\Delta R_{extent}$ in accordance with:

$$\Delta R_{cross\_range} = \frac{1}{\|\vec{p}_{bistatic\_vel\_new}\|} \frac{\lambda}{T_{dwell}},$$

and $$\Delta R_{extent} = \frac{1}{\|\vec{p}_{bistatic\_vel\_new}\|} \frac{\lambda}{IPP},$$

where $\lambda$ is the wavelength at the center frequency of the radar pulses, $T_{dwell}$ is dwell duration of the radar pulses, and IPP is the reciprocal of pulse repetition frequency (PRF) of the radar pulses.

BRIEF DESCRIPTION OF THE DRAWINGS

The foregoing features of various embodiments of the invention will be more readily understood by reference to the following detailed descriptions in the accompanying drawings.

DETAILED DESCRIPTION OF ILLUSTRATIVE EMBODIMENTS

The bistatic/multistatic ISAR methods and systems described herein (hereinafter "technology") can provide one or more of the following advantages. One advantage of the technology is that accurate ISAR images can be generated because the method for mapping Doppler frequency to cross-range is robust under a variety of tracking errors and deviations from a broadside collection geometry. Another advantage is that exploitation of the details in an ISAR image is improved because the technology permits the system to accurately estimate cross-range.

Figure 1:
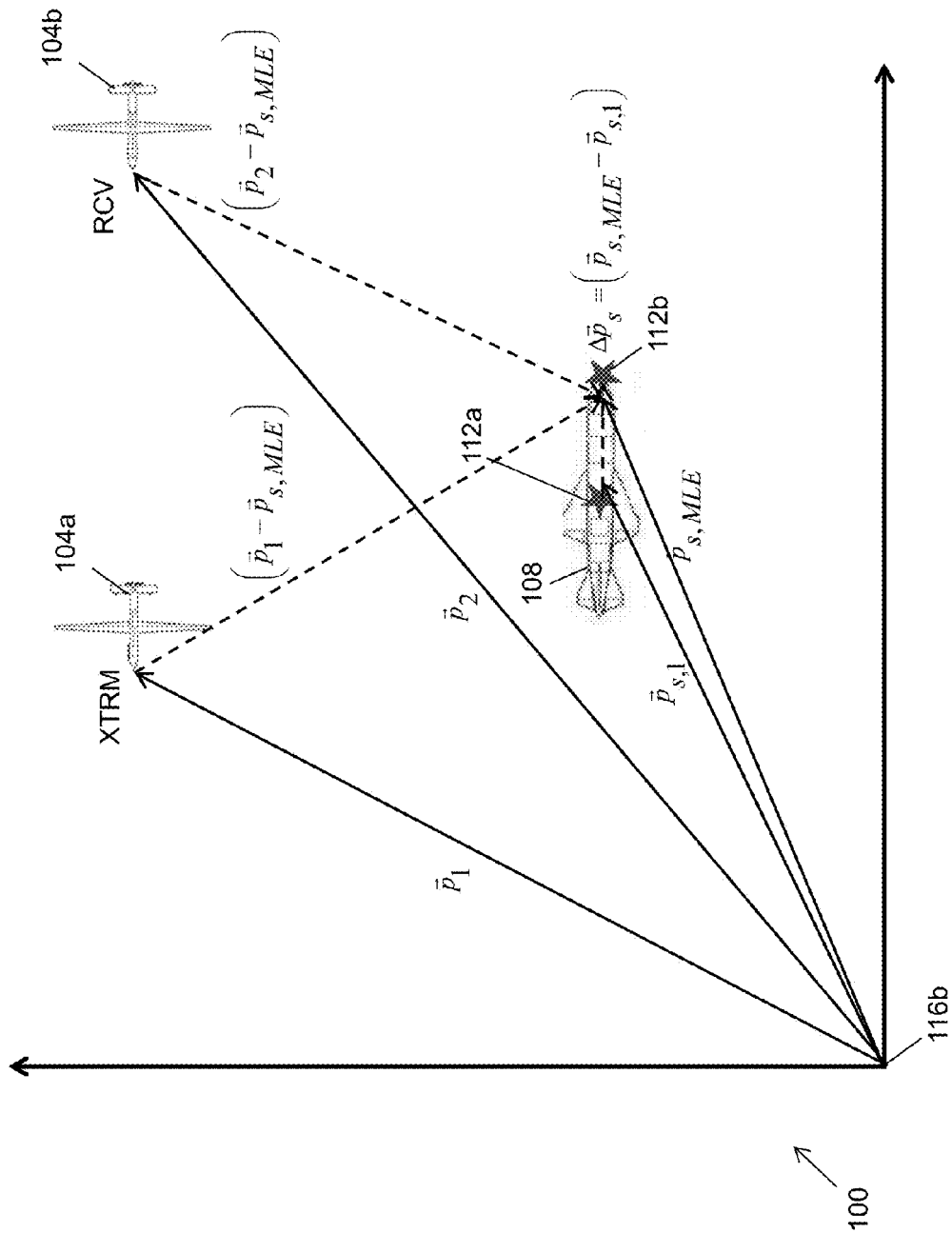
FIG. 1 is a schematic illustration of a bistatic imaging geometry environment of two platforms imaging a target, according to an illustrative embodiment.

FIG. 1 is a schematic illustration of a bistatic imaging geometry environment 100 of two airborne radar platforms 104a and 104b imaging a target 108, according to an illustrative embodiment. In this embodiment, the target 108 has two distinct target scatterers 112a and 112b. Two scatterers are not necessary for the final formation of an ISAR image. In some embodiments, there is a single scatterer or three or more scatterers. FIG. 1 illustrates the position vectors associated with the platforms 104a and 104b, and the target 108 in the environment 100. The description of the vectors is provided in Table 1.

TABLE 1

| | Postion Vectors |
|---|---|
| Variable | Definition |
| $\vec{p}_1$ | Position of imaging platform 1 |
| $\vec{p}_2$ | Position of imaging platform 2 |
| $\vec{p}_{s,1}$ | Position of a target scatterer |
| $\vec{p}_{s,MLE}$ | Position of dominant MLE scatterer |

$\vec{p}_1$ is a vector of the position of the first airborne radar platform 104a relative to a common reference point 116. $\vec{p}_2$ is a vector of the position of the second airborne radar platform 104b relative to the common reference point 116. $\vec{p}_{s,1}$ is a vector of the position of the first target scatterer 112a of the target 108 relative to the common reference point 116. $\vec{p}_{s,MLE}$ is a vector of the position of the second target scatterer 112b of the target 108 relative to the common reference point 116. In this embodiment, the second target scatterer 112b is the dominant scatterer of the target, denoted by MLE.

Figure 2:
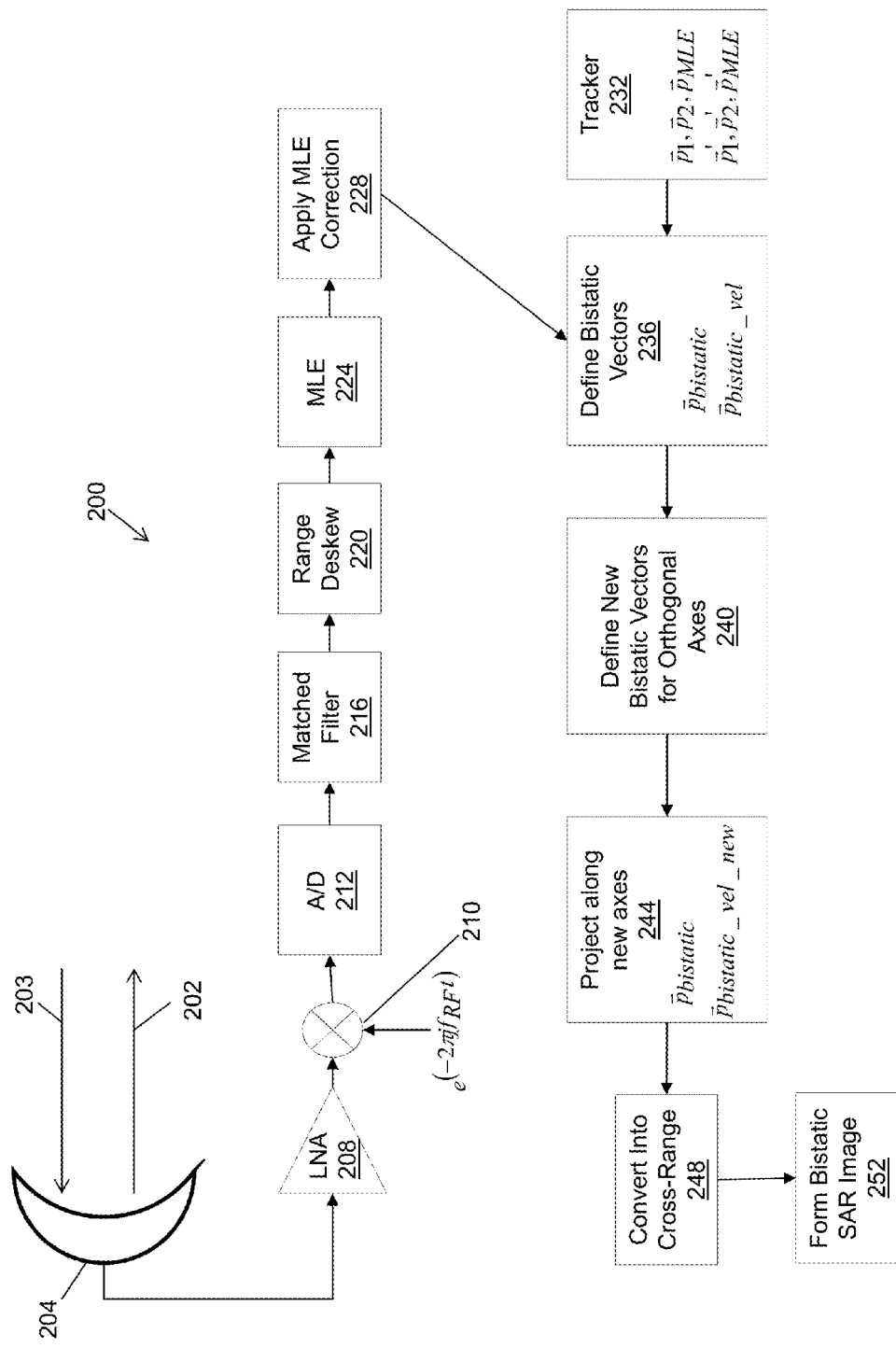
FIG. 2 is a flowchart of a bistatic synthetic aperture radar (SAR) imaging method for processing radar pulses acquired with a radar, according to an illustrative embodiment.

FIG. 2 is a flowchart 200 of a bistatic synthetic aperture radar (SAR) imaging method for processing radar pulses acquired with a pulse doppler radar 204 applied to the environment 100 of FIG. 1. In one exemplary embodiment, the pulse doppler radar 204 transmits a signal 202 and receives a return signal 203 reflected from a target (e.g., the target 108 of FIG. 1). The phase of the return signal is correlated with the phase of a model signal and due to doppler shifts in the return signal 203, an SAR image is generated. Radar targets are frequently modeled/imaged by the superposition of a plurality of point scatterers. In this embodiment, the target 108 has two point scatterers 112a and 112b.

The return signal 203 is passed through a low noise amplifier (LNA) (step 208) and then downconverted to reduce the radar return 203 pulses to a baseband frequency. The radar return pulses 203 are downconverted by combining each radar return 203 pulse with a sinusoid ($e^{-2\pi i f_{RF} t}$) (step 210). The downconverted radar return pulses are then provided to an A/D converter to convert the pulses to a digital signal for subsequent processing.

The baseband signal (output of A/D 212) is then passed through a matched filter (step 216) and then range deskewed (step 220) to remove the effects of its corresponding radar transmission pulse. A Fourier transform is applied at the application of the matched filter. Then, spectral equalization is achieved by factoring out the magnitude square of the Fourier transform of the transmitted pulse to perform the range deskewing (step 220) of the signal.

The radar return output of the range deskew step (step 220) is passed to a maximum likelihood estimate (MLE) block 224 for extraction of the target 108 motion parameters. The residual line-of-sight motion parameters of the target are estimated up to the cubic term using an MLE algorithm that operates on the most prominent target scatterer. The MLE estimate (step 224) determines the range signal, velocity signal, and acceleration signal for the dominant scatterer (scatterer 112b in FIG. 1) in the field of view of the radar antenna 204. In this embodiment, the assumption is made that the incoming target 108 is flying level and is not maneuvering. The MLE motion correction is then applied to produce a focused image (step 228). The correction is applied as follows:

$$Y(k,n) = W(k,n) \exp(-j\phi_{k,n}(\hat{r},\hat{v},\hat{\alpha})),$$

where W is the uncorrected signal, $\phi_{k,n}$ is the correction phase, and $\hat{r}$, $\hat{v}$, $\hat{\alpha}$ are the correction parameters (location, velocity, acceleration, respectively) determined by the MLE algorithm.

After the focused image is produced (step 228) with respect to the MLE point (i.e., dominant target scatterer), the phasor of the second principal scatterer is given by:

$$Y(k,n) = z e^{-j\frac{2\pi}{c}(f_{RF}+k\Delta f)(\Delta r + \Delta v nIPP)} \qquad \text{EQN. 1}$$

where $\Delta r$ is the range difference between the two scatterers, $\Delta v$ is the velocity difference between the two scatterers, c is the speed of light, $f_{RF}$ is the waveform center frequency, $\Delta f$ is the fast-time frequency step, k and n are respectively the fast-time and slow-time indices, z is the complex envelope of the scatterer, and IPP is the inter-pulse period. The range difference $\Delta r$ is written as:

$$\Delta r = -\frac{(\vec{p}_2(0)-\vec{p}_s(0))}{\|\vec{p}_2(0)-\vec{p}_s(0)\|}\cdot\Delta\vec{p}_s - \frac{(\vec{p}_1(0)-\vec{p}_s(0))}{\|\vec{p}_1(0)-\vec{p}_s(0)\|}\cdot\Delta\vec{p}_s \qquad \text{EQN. 2}$$

$$= -\Delta\vec{p}_s \cdot \left[\frac{(\vec{p}_2(0)-\vec{p}_s(0))}{\|\vec{p}_2(0)-\vec{p}_s(0)\|} + \frac{(\vec{p}_1(0)-\vec{p}_s(0))}{\|\vec{p}_1(0)-\vec{p}_s(0)\|}\right]$$

where $\vec{p}_1(0)$, $\vec{p}_2(0)$, $\Delta\vec{p}_s$ are the vectors defined in Table 1 in the middle of the data collection dwell. The position and velocity vector estimates are acquired for the airborne radar platforms and the scattering locations on the target (step 232), where: $\Delta\vec{p}_s = (\vec{p}_{s,MLE} - \vec{p}_{s,1})$. The estimates can be acquired with a tracker. The target tracking is carried out with methods and technologies common in the field, as described in Samuel S. Blackman's book "Multiple-Target Tracking with Radar Applications", Artech House, 1986, Dedham, Mass.", the entire contents of which is hereby incorporated by reference.

The velocity difference $\Delta v$ is given by:

$$\Delta v = \left[\frac{\Delta\vec{p}_s \cdot (\vec{p}_2'(0)-\vec{p}_s'(0))}{\|\vec{p}_2(0)-\vec{p}_s(0)\|} + \frac{(\vec{p}_2(0)-\vec{p}_s(0))}{\|\vec{p}_2(0)-\vec{p}_s(0)\|^2}\cdot(\vec{p}_2'(0)-\vec{p}_s'(0))\frac{(\vec{p}_2(0)-\vec{p}_s(0))}{\|\vec{p}_2(0)-\vec{p}_s(0)\|}\cdot\Delta\vec{p}_s\right] + \\ \left[\frac{\Delta\vec{p}_s \cdot (\vec{p}_1'(0)-\vec{p}_s'(0))}{\|\vec{p}_1(0)-\vec{p}_s(0)\|} + \frac{(\vec{p}_1(0)-\vec{p}_s(0))}{\|\vec{p}_1(0)-\vec{p}_s(0)\|^2}\cdot(\vec{p}_1'(0)-\vec{p}_s'(0))\frac{(\vec{p}_1(0)-\vec{p}_s(0))}{\|\vec{p}_1(0)-\vec{p}_s(0)\|}\cdot\Delta\vec{p}_s\right] \qquad \text{EQN. 3}$$

which can be written as:

$$\Delta v = \Delta\vec{p}_s \cdot \left[\begin{array}{c}\frac{(\vec{p}_2'(0)-\vec{p}_s'(0))}{\|\vec{p}_2(0)-\vec{p}_s(0)\|} + \frac{(\vec{p}_2(0)-\vec{p}_s(0))}{\|\vec{p}_2(0)-\vec{p}_s(0)\|^2}\cdot(\vec{p}_2'(0)-\vec{p}_s'(0))\frac{(\vec{p}_2(0)-\vec{p}_s(0))}{\|\vec{p}_2(0)-\vec{p}_s(0)\|} + \\ \frac{(\vec{p}_1'(0)-\vec{p}_s'(0))}{\|\vec{p}_1(0)-\vec{p}_s(0)\|} + \frac{(\vec{p}_1(0)-\vec{p}_s(0))}{\|\vec{p}_1(0)-\vec{p}_s(0)\|^2}\cdot(\vec{p}_1'(0)-\vec{p}_s'(0))\frac{(\vec{p}_1(0)-\vec{p}_s(0))}{\|\vec{p}_1(0)-\vec{p}_s(0)\|}\end{array}\right] \qquad \text{EQN. 4}$$

The second term of EQN. 4 is defined as $\vec{p}_{bistatic\_vel}$, such that $\Delta v$ then becomes $$\Delta v = \Delta\vec{p}_s \cdot \vec{p}_{bistatic\_vel}. \qquad \text{EQN. 5}$$

Now, the tracker measurements (step 232) of range and velocity for the target and the two imaging platforms is used to define the bistatic range and bistatic velocity, and $\Delta\vec{p}_s$ is defined from its projections into two linearly independent vectors (step 236 of FIG. 2) in accordance with:

$$\vec{p}_{bistatic} = \frac{(\vec{p}_2(0)-\vec{p}_s(0))}{\|\vec{p}_2(0)-\vec{p}_s(0)\|} + \frac{(\vec{p}_1(0)-\vec{p}_s(0))}{\|\vec{p}_1(0)-\vec{p}_s(0)\|}, \qquad \text{EQN. 6}$$

and $$\vec{p}_{bistatic\_vel} = \left[\begin{array}{c}\frac{(\vec{p}_2'(0)-\vec{p}_s'(0))}{\|\vec{p}_2(0)-\vec{p}_s(0)\|} + \frac{(\vec{p}_2(0)-\vec{p}_s(0))}{\|\vec{p}_2(0)-\vec{p}_s(0)\|^2}\cdot(\vec{p}_2'(0)-\vec{p}_s'(0))\frac{(\vec{p}_2(0)-\vec{p}_s(0))}{\|\vec{p}_2(0)-\vec{p}_s(0)\|} + \\ \frac{(\vec{p}_1'(0)-\vec{p}_s'(0))}{\|\vec{p}_1(0)-\vec{p}_s(0)\|} + \frac{(\vec{p}_1(0)-\vec{p}_s(0))}{\|\vec{p}_1(0)-\vec{p}_s(0)\|^2}\cdot(\vec{p}_1'(0)-\vec{p}_s'(0))\frac{(\vec{p}_1(0)-\vec{p}_s(0))}{\|\vec{p}_1(0)-\vec{p}_s(0)\|}\end{array}\right] \qquad \text{EQN. 7}$$

where $\vec{p}_{bistatic}$ is the bistatic range vector and $\vec{p}_{bistatic\_vel}$ is the bistatic velocity vector, and $\vec{p}_1(0)$ is a vector of an initial position of the first airborne radar platform, $\vec{p}_2(0)$ is a vector of an initial position of the second airborne radar platform, $\vec{p}_1'(0)$ is a vector of an initial velocity of the first airborne radar platform, $\vec{p}_2'(0)$ is a vector of an initial velocity of the second airborne radar platform and $\Delta\vec{p}_s$ is difference between a dominant scattering location on the target and a second scattering location on the target.

The following two equations define the distance $\|\Delta\vec{p}_s\|$ of the MLE point from the other principal scatterer along the plane defined by the vectors $\vec{p}_{bistatic}$ and $\vec{p}_{bistatic\_vel}$:

$$\Delta r_{bistatic} = -\Delta\vec{p}_s \cdot \vec{p}_{bistatic} \quad \text{EQN. 8,}$$

and $$\Delta v_{bistatic} = \Delta\vec{p}_s \cdot \vec{p}_{bistatic\_vel} \quad \text{EQN. 9}$$

The distance of the MLE point from the other principal scatterers is approximated from 2 linearly independent vectors. However, the ISAR map of the target may be distorted by the non-orthogonality of the $\vec{p}_{bistatic}$ and $\vec{p}_{bistatic\_vel}$ vectors (this is the case when the data collection geometry is not pure broadside, or 90° squint angle). It is more appropriate to redefine an orthogonal set of axes (step 240) defined by $\vec{p}_{bistatic}$ and $\vec{p}_{bistatic\_vel\_new}$, which involves a projection of the vector distance difference between the target scatterers along the new set of orthogonal axes in accordance with.

$$\vec{p}_{bistatic\_vel\_new} = \vec{p}_{bistatic\_vel} - \frac{(\vec{p}_{bistatic} \cdot \vec{p}_{bistatic\_vel})}{\|\vec{p}_{bistatic}\|^2} \vec{p}_{bistatic}. \quad \text{EQN. 10}$$

The new range and velocity measurements are defined in accordance with:

$$\Delta r_{bistatic} = -\Delta\vec{p}_s \cdot \vec{p}_{bistatic} \quad \text{EQN. 11}$$

$$\Delta v_{bistatic\_new} = \Delta\vec{p}_s \cdot \vec{p}_{bistatic\_vel\_new}. \quad \text{EQN. 12}$$

The above redefinition is performed to avoid target distortions at non-broadside geometries. From EQN. 12, we now have:

$$\Delta v_{bistatic\_res} = \frac{\lambda}{T_{dwell}} \Rightarrow \Delta\vec{p}_s \cdot \vec{p}_{bistatic\_vel\_new} = \frac{\lambda}{T_{dwell}} \quad \text{EQN. 13}$$

where $\lambda$ is the wavelength at the center frequency of the radar pulses, $T_{dwell}$ is dwell duration of the radar pulses, and IPP is the reciprocal of pulse repetition frequency (PRF) of the radar pulses.

The cross-range extent of the image is estimated and the Doppler frequency axis is mapped to cross-range in accordance with (step 248):

$$\Delta R_{cross\_range} = \frac{1}{\|\vec{p}_{bistatic\_vel\_new}\|} \frac{\lambda}{T_{dwell}}, \quad \text{EQN. 14}$$

and $$\Delta R_{extent} = \frac{1}{\|\vec{p}_{bistatic\_vel\_new}\|} \frac{\lambda}{IPP}. \quad \text{EQN. 15}$$

The final step is to form a bistatic ISAR image in range and cross-range (step 252). The image is formed by taking a 2-dimensional Fast Fourier Transform of the complex time series given by EQN. 2. The Doppler extent in the image is converted to cross-range extent by applying the scaling factor given in EQN. 14, where $\Delta/T_{dwell}$ is the Doppler frequency and $1/\|\vec{p}_{bistatic\_vel\_new}\|$ is the scaling factor that converts the Doppler frequency to cross-range.

Figure 3:
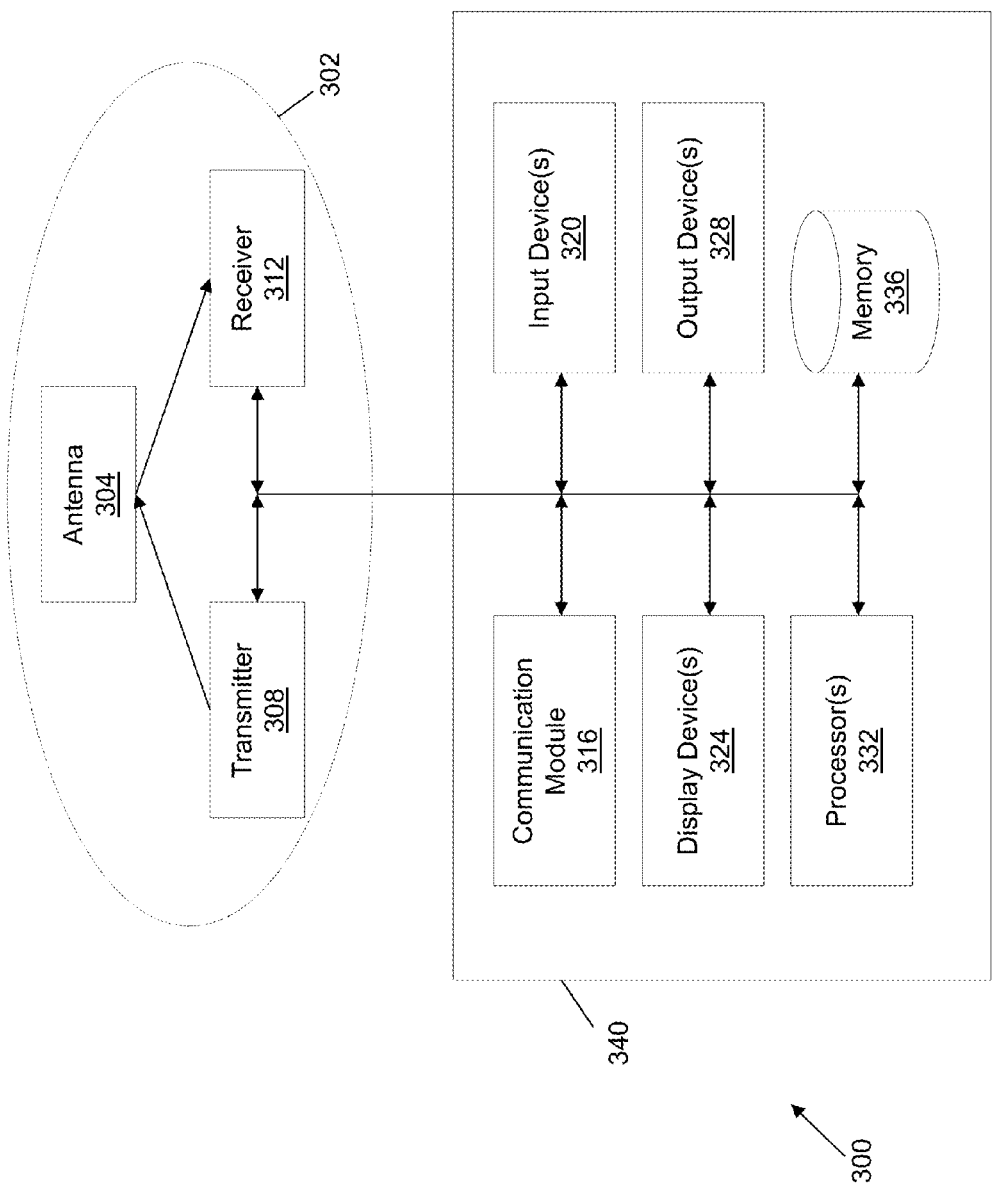
FIG. 3 is a schematic illustration of a bistatic synthetic aperture radar (SAR) imaging system, according to an illustrative embodiment.

FIG. 3 is a schematic illustration of a bistatic synthetic aperture radar (SAR) imaging system 300, according to an illustrative embodiment. The system 300 a SAR radar 302 (e.g., radar 202 of FIG. 2) which includes a radar antenna 304, a transmitter 308, and a receiver 312. The system 300 also includes a controller 340. The controller 340 includes a communication module 316, one or more input devices 320, one or more output devices 328, one or more display devices 324, one or more processors 332, and memory 336. The modules and devices described herein can, for example, utilize the processor 332 to execute computer executable instructions and/or the modules and devices described herein can, for example, include their own processor to execute computer executable instructions. It should be understood the controller 340 can include, for example, other modules, devices, and/or processors known in the art and/or varieties of the described modules, devices, and/or processors.

The communication module 316 includes circuitry and code corresponding to computer instructions that enable the computing device to send/receive signals to/from the antenna 304. For example, the communication module 316 provides commands from the processor 332 to the transmitter 308 to control how the antenna 304 transmits radar pulses during operation. The communication module 316 also, for example, receives data corresponding to the radar return pulses received by the receiver 312. The received data can be, for example, stored by the memory 336 or otherwise processed by the processor 332.

The input devices 320 receive information from a user (not shown) and/or another computing system (not shown). The input devices 320 can include, for example, a keyboard, a scanner, a microphone, a stylus, a touch sensitive pad or display. The output devices 328 output information associated with the control module 120 (e.g., information to a printer, information to a speaker). The display devices 324 display operating information and performance information (e.g., graphical representations of information) regarding the SAR imaging methods. The processor 332 executes the operating system and/or any other computer executable instructions for the controller 340 (e.g., executes applications). The memory 336 stores a variety of information/data, including profiles used by the controller 340 to specify how the system 300 generates bistatic SAR images. The memory 336 can include, for example, long-term storage, such as a hard drive, a tape storage device, or flash memory; short-term storage, such as a random access memory, or a graphics memory; and/or any other type of computer readable storage.

Figure 4:
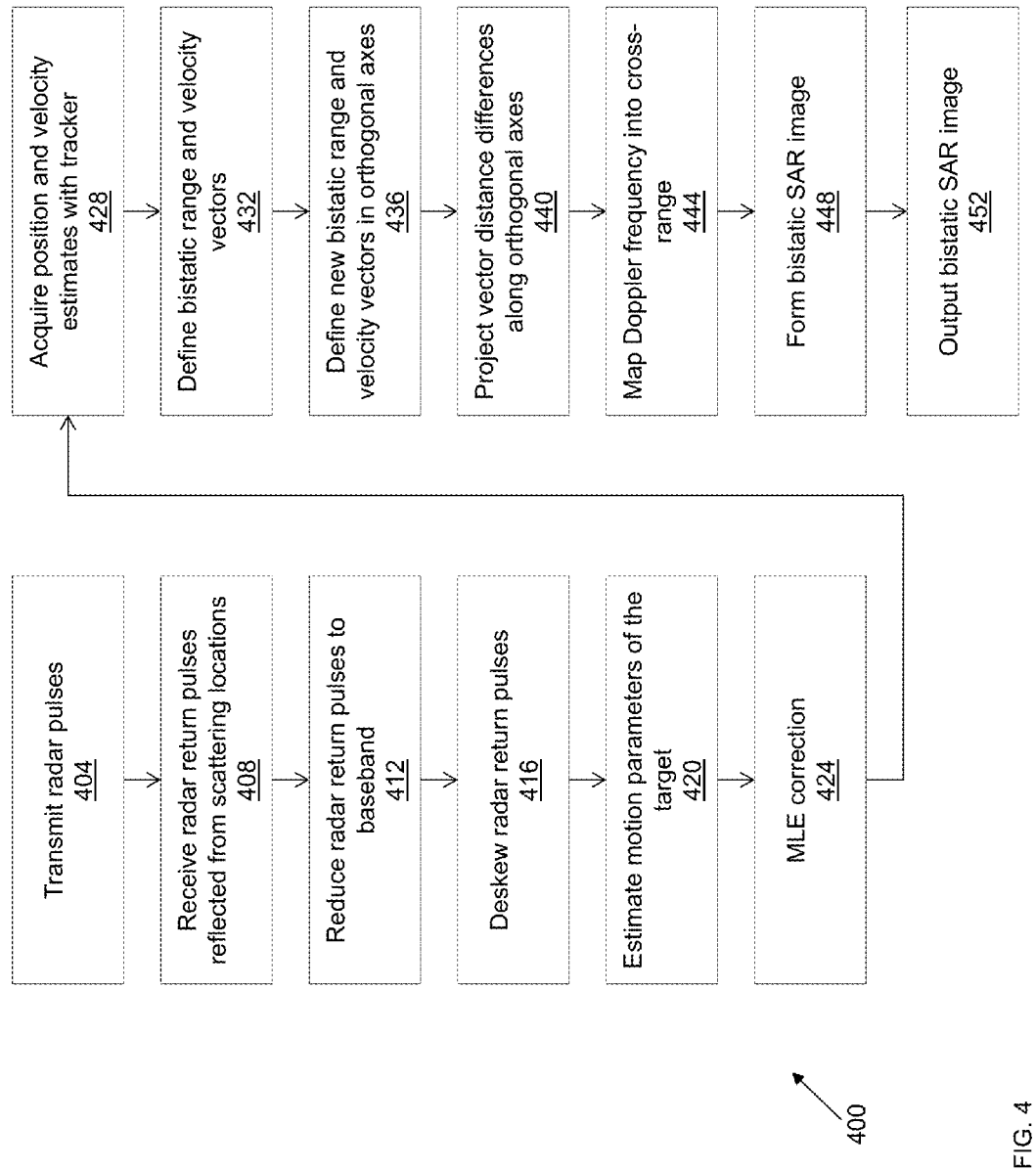
FIG. 4 is a flowchart of a bistatic synthetic aperture radar (SAR) imaging method, according to an illustrative embodiment.

FIG. 4 is a flowchart 400 of a bistatic synthetic aperture radar (SAR) imaging method, according to an illustrative embodiment. The method includes transmitting a plurality of radar pulses towards a target (step 404). The method also includes receiving a plurality of radar return pulses acquired by at least first and second airborne radar platforms, wherein each radar return pulse is generated in response to a corresponding transmission pulse reflected from two or more radar scattering locations on a target (step 408). The method then includes combining each radar return pulse with a sinusoid to reduce the radar return pulses to a base band frequency (step 412), similarly as described above with respect to step 210 of FIG. 2.

The method then includes deskewing each reduced radar return pulse to remove effects of its corresponding radar transmission pulse (step 416). The method then includes estimating motion parameters of the target based on a maximum likelihood estimation (MLE) applied to the deskewed radar return pulses (step 420).

The method then includes performing MLE motion correction to the deskewed radar return pulses based on the estimated motion parameters to generate motion corrected radar return pulses (step 424). The method then includes acquiring position and velocity estimates of the two or more airborne radar platforms and the one or more scattering locations on the target (step 428). Step 428 can be performed by a tracker, as described above with respect to, for example step 232 of FIG. 2. The method then includes defining bistatic range and velocity vectors based on the position and velocity estimates of the first and second airborne radar platforms, the one or more scattering locations on the target, and the motion corrected radar return pulses (step 432).

The method then includes defining new bistatic range and velocity vectors by redefining the bistatic range and velocity vectors in a new set of orthogonal axes (step 436). The method then includes projecting vector distance differences between the target radar scattering locations along the new set of orthogonal axes to generate new range and velocity measurements along the new set of orthogonal axes (step 440).

The method then includes converting the new range and velocity measurements in order to map Doppler frequency into cross-range, measured in physical units of length (step 444). The method then includes forming a bistatic SAR image in range and cross-range based on cross-range extent derived from the Doppler frequency mapping (step 448). The method then includes outputting the data associated with the bistatic SAR image (step 452). The output data can be stored in computer memory or processed further by, for example, a tracking system used to track the target.

The above-described systems and methods can be implemented in digital electronic circuitry, in computer hardware, firmware, and/or software. The implementation can be as a computer program product that is tangibly embodied in non-transitory memory device. The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors, or one or more servers that include one or more processors, that execute a computer program to perform functions of the disclosure by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data. Magnetic disks, magneto-optical disks, or optical disks are examples of such storage devices.

Data transmission and instructions can occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A bistatic synthetic aperture radar (SAR) imaging method, the method comprising:
   receiving a plurality of radar return pulses acquired by at least first and second airborne radar platforms, wherein each radar return pulse is generated in response to a corresponding transmission pulse reflected from two or more radar scattering locations on a target;
   combining each radar return pulse with a sinusoid to reduce the radar return pulses to a base band frequency;
   deskewing each reduced radar return pulse to remove effects of its corresponding radar transmission pulse;
   estimating motion parameters of the target based on a maximum likelihood estimation (MLE) applied to the deskewed radar return pulses;
   performing MLE motion correction to the deskewed radar return pulses based on the estimated motion parameters to generate motion corrected radar return pulses;
   acquiring position and velocity estimates of the two or more airborne radar platforms and the one or more scattering locations on the target;
   defining bistatic range and velocity vectors based on the position and velocity estimates of the first and second airborne radar platforms, the one or more scattering locations on the target, and the motion corrected radar return pulses;

defining new bistatic range and velocity vectors by redefining the bistatic range and velocity vectors in a new set of orthogonal axes;
projecting vector distance differences between the target radar scattering locations along the new set of orthogonal axes to generate new range and velocity measurements along the new set of orthogonal axes;
converting the new range and velocity measurements in order to map Doppler frequency into cross-range, measured in physical units of length; and
forming a bistatic SAR image in range and cross-range based on cross-range extent derived from the Doppler frequency mapping;
wherein the steps in the method are carried out by a processor.

2. The method of claim 1, wherein the bistatic range and velocity vectors are defined according to:

$$\vec{p}_{bistatic} = \frac{(\vec{p}_2(0) - \vec{p}_s(0))}{\|\vec{p}_2(0) - \vec{p}_s(0)\|} + \frac{(\vec{p}_1(0) - \vec{p}_s(0))}{\|\vec{p}_1(0) - \vec{p}_s(0)\|}$$

$$\vec{p}_{bistatic\_vel} = \begin{bmatrix} \frac{(\vec{p}_2'(0) - \vec{p}_s'(0))}{\|\vec{p}_2(0) - \vec{p}_s(0)\|} + \frac{(\vec{p}_2(0) - \vec{p}_s(0))}{\|\vec{p}_2(0) - \vec{p}_s(0)\|^2} \cdot (\vec{p}_2'(0) - \vec{p}_s'(0)) \frac{(\vec{p}_2(0) - \vec{p}_s(0))}{\|\vec{p}_2(0) - \vec{p}_s(0)\|} + \\ \frac{(\vec{p}_1'(0) - \vec{p}_s'(0))}{\|\vec{p}_1(0) - \vec{p}_s(0)\|} + \frac{(\vec{p}_1(0) - \vec{p}_s(0))}{\|\vec{p}_1(0) - \vec{p}_s(0)\|^2} \cdot (\vec{p}_1'(0) - \vec{p}_s'(0)) \frac{(\vec{p}_1(0) - \vec{p}_s(0))}{\|\vec{p}_1(0) - \vec{p}_s(0)\|} \end{bmatrix}$$

where $\vec{p}_{multistatic}$ is the bistatic range vector and $\vec{p}_{bistatic\_vel}$ is the bistatic velocity vector, and $\vec{p}_1(0)$ is a vector of an initial position of the first airborne radar platform, $\vec{p}_2(0)$ is a vector of an initial position of the second airborne radar platform, $\vec{p}_1'(0)$ is a vector of an initial velocity of the first airborne radar platform, $\vec{p}_2'(0)$ is a vector of an initial velocity of the second airborne radar platform and $\Delta \vec{p}_s$ is difference between a dominant scattering location on the target and a second scattering location on the target.

3. The method of claim 2, wherein the new bistatic range and velocity vectors are orthogonal parameters determined in accordance with:

$$\vec{p}_{bistatic},$$

and $$\vec{p}_{bistatic\_vel\_new} = \vec{p}_{bistatic\_vel} - \frac{(\vec{p}_{bistatic} \cdot \vec{p}_{bistatic\_vel})}{\|\vec{p}_{bistatic}\|^2} \vec{p}_{bistatic}.$$

4. The method of claim 3, wherein the new range and velocity measurements along the new set of orthogonal axes are determined in accordance with:

$$\Delta r_{bistatic} = -\Delta \vec{p}_s \cdot \vec{p}_{bistatic}$$

$$\Delta v_{bistatic\_new} = \Delta \vec{p}_s \cdot \vec{p}_{bistatic\_vel\_new}.$$

5. The method of claim 4, comprising using the new range and velocity measurements to define cross-range resolution $\Delta R_{cross\_range}$ and cross-range extent $\Delta R_{extent}$ in accordance with:

$$\Delta R_{cross\_range} = \frac{1}{\|\vec{p}_{bistatic\_vel\_new}\|} \frac{\lambda}{T_{dwell}},$$

and $$\Delta R_{extent} = \frac{1}{\|\vec{p}_{bistatic\_vel\_new}\|} \frac{\lambda}{IPP},$$

where $\lambda$ is the wavelength at the center frequency of the radar pulses, $T_{dwell}$ is dwell duration of the radar pulses, and IPP is the reciprocal of pulse repetition frequency (PRF) of the radar pulses.

6. A bistatic synthetic aperture radar (SAR) imaging system, the system comprising:
one or more processor; and
a memory, the memory including executable code representing instructions that when executed cause the system to:

receive a plurality of radar return pulses acquired by at least first and second airborne radar platforms, wherein each radar return pulse is generated in response to a corresponding transmission pulse reflected from two or more radar scattering locations on a target;
combine each radar return pulse with a sinusoid to reduce the radar return pulses to a base band frequency;
deskew each reduced radar return pulse to remove effects of its corresponding radar transmission pulse;
estimate motion parameters of the target based on a maximum likelihood estimation (MLE) applied to the deskewed radar return pulses;
perform MLE motion correction to the deskewed radar return pulses based on the estimated motion parameters to generate motion corrected radar return pulses;
acquire position and velocity estimates of the two or more airborne radar platforms and the one or more scattering locations on the target;
define bistatic range and velocity vectors based on the position and velocity estimates of the first and second airborne radar platforms, the one or more scattering locations on the target, and the motion corrected radar return pulses;
define new bistatic range and velocity vectors by redefining the bistatic range and velocity vectors in a new set of orthogonal axes;
project vector distance differences between the target radar scattering locations along the new set of orthogonal axes to generate new range and velocity measurements along the new set of orthogonal axes;
convert the new range and velocity measurements in order to map Doppler frequency into cross-range, measured in physical units of length; and
form a bistatic SAR image in range and cross-range based on cross-range extent derived from the Doppler frequency mapping.

7. The system of claim 6, wherein the bistatic range and velocity vectors are defined according to:

$$\vec{p}_{bistatic} = \frac{(\vec{p}_2(0) - \vec{p}_s(0))}{\|\vec{p}_2(0) - \vec{p}_s(0)\|} + \frac{(\vec{p}_1(0) - \vec{p}_s(0))}{\|\vec{p}_1(0) - \vec{p}_s(0)\|}$$

$$\vec{p}_{bistatic\_vel} = \begin{bmatrix} \frac{(\vec{p}'_2(0) - \vec{p}'_s(0))}{\|\vec{p}_2(0) - \vec{p}_s(0)\|} + \frac{(\vec{p}_2(0) - \vec{p}_s(0))}{\|\vec{p}_2(0) - \vec{p}_s(0)\|^2} \cdot (\vec{p}'_2(0) - \vec{p}'_s(0)) \frac{(\vec{p}_2(0) - \vec{p}_s(0))}{\|\vec{p}_2(0) - \vec{p}_s(0)\|} + \\ \frac{(\vec{p}'_1(0) - \vec{p}'_s(0))}{\|\vec{p}_1(0) - \vec{p}_s(0)\|} + \frac{(\vec{p}_1(0) - \vec{p}_s(0))}{\|\vec{p}_1(0) - \vec{p}_s(0)\|^2} \cdot (\vec{p}'_1(0) - \vec{p}'_s(0)) \frac{(\vec{p}_1(0) - \vec{p}_s(0))}{\|\vec{p}_1(0) - \vec{p}_s(0)\|} \end{bmatrix}$$

where $\vec{p}_{bistatic}$ is the bistatic range vector and $\vec{p}_{bistatic\_vel}$ is the bistatic velocity vector, and $\vec{p}_1(0)$ is a vector of an initial position of the first airborne radar platform, $\vec{p}_2(0)$ is a vector of an initial position of the second airborne radar platform, $\vec{p}_1'(0)$ is a vector of an initial velocity of the first airborne radar platform, $\vec{p}_2'(0)$ is a vector of an initial velocity of the second airborne radar platform and $\Delta \vec{p}_s$ is difference between a dominant scattering location on the target and a second scattering location on the target.

8. The system of claim 7, wherein the new bistatic range and velocity vectors are orthogonal parameters determined in accordance with:

$$\vec{p}_{bistatic},$$

and $$\vec{p}_{bistatic\_vel\_new} = \vec{p}_{bistatic\_vel} - \frac{(\vec{p}_{bistatic} \cdot \vec{p}_{bistatic\_vel})}{\|\vec{p}_{bistatic}\|^2} \vec{p}_{bistatic}.$$

9. The system of claim 8, wherein the new range and velocity measurements along the new set of orthogonal axes are determined in accordance with:

$$\Delta r_{bistatic} = -\Delta \vec{p}_s \cdot \vec{p}_{bistatic}$$

$$\Delta v_{bistatic\_new} = \Delta \vec{p}_2 \cdot \vec{p}_{bistatic\_vel\_new}.$$

10. The system of claim 9, wherein the memory includes executable code representing instructions that when executed cause the system to use the new range and velocity measurements to define cross-range resolution $\Delta R_{cross\_range}$ and cross-range extent $\Delta R_{extent}$ in accordance with:

$$\Delta R_{cross\_range} = \frac{1}{\|\vec{p}_{bistatic\_vel\_new}\|} \frac{\lambda}{T_{dwell}},$$

and $$\Delta R_{extent} = \frac{1}{\|\vec{p}_{bistatic\_vel\_new}\|} \frac{\lambda}{IPP},$$

where $\lambda$ is the wavelength at the center frequency of the radar pulses, $T_{dwell}$ is dwell duration of the radar pulses, and IPP is the reciprocal of pulse repetition frequency (PRF) of the radar pulses.

* * * * *